US010385154B2

(12) United States Patent
Kim et al.

(10) Patent No.: US 10,385,154 B2
(45) Date of Patent: Aug. 20, 2019

(54) METHOD FOR PREPARING DIENE-BASED RUBBER POLYMER, DIENE-BASED RUBBER POLYMER PREPARED THEREFROM AND ACRYLONITRILE-BUTADIENE-STYRENE GRAFT COPOLYMER OF CORE-SHELL STRUCTURE COMPRISING THE SAME

(71) Applicant: LG CHEM, LTD., Seoul (KR)

(72) Inventors: Yoo Vin Kim, Daejeon (KR); Young Min Kim, Daejeon (KR); Jin Hyoung Lee, Daejeon (KR); Su Jeong Han, Daejeon (KR); Young Hwan Jeong, Daejeon (KR); Sun Haeng Chung, Daejeon (KR); Jae Min Suk, Daejeon (KR)

(73) Assignee: LG CHEM, LTD., Seoul (KR)

( * ) Notice: Subject to any disclaimer, the term of this patent is extended or adjusted under 35 U.S.C. 154(b) by 187 days.

(21) Appl. No.: 15/534,468

(22) PCT Filed: Dec. 15, 2015

(86) PCT No.: PCT/KR2015/013752
§ 371 (c)(1),
(2) Date: Jun. 8, 2017

(87) PCT Pub. No.: WO2016/099129
PCT Pub. Date: Jun. 23, 2016

(65) Prior Publication Data

US 2017/0349689 A1 Dec. 7, 2017

(30) Foreign Application Priority Data

Dec. 16, 2014 (KR) ........................ 10-2014-0181126

(51) Int. Cl.
*C08F 36/06* (2006.01)
*C08F 136/06* (2006.01)
*C08F 279/04* (2006.01)
*C08F 2/22* (2006.01)

(52) U.S. Cl.
CPC .............. *C08F 279/04* (2013.01); *C08F 2/22* (2013.01); *C08F 36/06* (2013.01)

(58) Field of Classification Search
None
See application file for complete search history.

(56) References Cited

U.S. PATENT DOCUMENTS

2003/0018125 A1 1/2003 Yoo et al.
2005/0124760 A1* 6/2005 Nakamura ............ C08F 236/10 525/66
2009/0076205 A1 3/2009 Huang et al.
2009/0118393 A1* 5/2009 Yoo ....................... C08F 279/02 523/335
2014/0080976 A1 3/2014 Chai et al.
2015/0051333 A1 2/2015 Ahn et al.

FOREIGN PATENT DOCUMENTS

CN 1383444 A 12/2002
CN 102311527 A 1/2012
CN 103687881 A 3/2014
GB 1408819 A 10/1975
JP S49087784 A 8/1974
JP 09286827 * 11/1997
JP H09286827 A 11/1997
KR 10-2002-0039855 A 5/2002
KR 10-2006-0119255 A 11/2006
KR 10-2007-0047072 A 5/2007
KR 10-2009-0047063 A 5/2009
KR 10-2010-0038700 A 4/2010
KR 10-2010-0043303 A 4/2010
KR 10-1279267 B1 6/2013
KR 10-2013-0078367 A 7/2013

OTHER PUBLICATIONS

International Search Report for International Patent Application No. PCT/KR2015/013752 filed on Dec. 15, 2015.
Extended European Search Report for European Application No. 15870296.9 dated Nov. 17, 2017.
Chinese Office Action for Chinese Application No. 201580067860X, dated Oct. 16, 2018.

* cited by examiner

*Primary Examiner* — David J Buttner

(57) ABSTRACT

The present invention relates to a method for preparing a diene-based rubber polymer having relatively low gel content and high swelling index while having high polymerization conversion rate, a diene-based rubber polymer prepared therefrom and an acrylonitrile-butadiene-styrene graft copolymer with a core-shell structure comprising the same as a core. Accordingly, the method for preparing a diene-based rubber polymer and the acrylonitrile-butadiene-styrene graft copolymer with a core-shell structure comprising the diene-based rubber polymer prepared therefrom can be easily applied to the industries requiring them, in particular, an impact reinforcing agent industry.

10 Claims, No Drawings

METHOD FOR PREPARING DIENE-BASED RUBBER POLYMER, DIENE-BASED RUBBER POLYMER PREPARED THEREFROM AND ACRYLONITRILE-BUTADIENE-STYRENE GRAFT COPOLYMER OF CORE-SHELL STRUCTURE COMPRISING THE SAME

CROSS-REFERENCE TO RELATED APPLICATION

This application is a U.S. National Stage of International Patent Application No. PCT/KR2015/013752, filed on Dec. 15, 2015, which claims priority of Korean Patent Application No. 10-2014-0181126, filed on Dec. 16, 2014, which is hereby incorporated by reference in its entirety.

TECHNICAL FIELD

The present invention relates to a method for preparing a diene-based rubber polymer having relatively low gel content and high swelling index while having high polymerization conversion rate, a diene-based rubber polymer prepared therefrom and an acrylonitrile-butadiene-styrene graft copolymer with a core-shell structure comprising the same as a core.

BACKGROUND ART

In general, an acrylonitrile-butadiene-styrene (hereinafter, called 'ABS')-based resin is widely used to electricity, electronic parts, office machines, car parts and the like due to its relatively good properties such as impact resistance, mechanical strength, moldability, gloss and the like.

The ABS-based resin is much influenced by properties such as average particle diameter and the like of diene-based rubber latex as a rubber ingredient. For example, properties of the ABS-based resin may vary depending on average particle diameter, a gel content and a swelling index of the diene-based rubber latex.

Specifically, the ABS-based resin is commonly prepared by an emulsion polymerization method. Diene-based rubber latex is prepared by the emulsion polymerization method to provide impact strength, an aromatic vinyl compound and a vinyl cyanide compound are added thereto and subjected to graft reaction by the emulsion polymerization method to prepare an acrylonitrile-butadiene-styrene graft copolymer, and then a styrene-acrylonitrile copolymer (hereinafter, SAN) is mixed to the graft copolymer to finally prepare thermoplastic ABS resin.

In this case, the diene-based rubber polymer can be advantageously applied to the production of ABS-based resin when polymerization conversion rate reaches 90% or higher, and when the polymerization conversion rate of the diene-based rubber polymer is 90% or higher, the polymer may have a gel content of 90% to 95% and a swelling index of 14 to 20.

The gel content and the swelling index are closely related to the polymerization conversion rate and a polymerization reaction temperature. For example, in order to increase the polymerization conversion rate, polymerization is conducted at a relatively high temperature, and therefore, the gel content is rapidly increased but the swelling index is largely decreased as the polymerization conversion rate improves. When the gel content is high, transparency may be increased due to low swelling index but impact resistance may be decreased. On the contrary, when the gel content is too low but the swelling index is too high, the impact resistance may be improved but the transparency may be decreased. Thus, in order to obtain ABS-based resin having excellent properties, a diene-based rubber polymer having properly controlled a polymerization conversion rate, a particle diameter, a gel content and a swelling index is required.

REFERENCES OF THE RELATED ART

Korean Patent Publication No. 10-1279267

DISCLOSURE OF THE INVENTION

Technical Problem

In order to solve the above problems, one object of the present invention is to provide a method for preparing a diene-based rubber polymer having relatively low gel content and high swelling index while having high polymerization conversion rate.

Another object of the present invention is to provide a diene-based rubber polymer prepared from the method for preparing a diene-based rubber polymer.

Further another object of the present invention is to provide an acrylonitrile-butadiene-styrene graft copolymer with a core-shell structure comprising the diene-based rubber polymer as a core.

Technical Solution

In order to accomplish the objects described above, the present invention provides a method for preparing a diene-based rubber polymer comprising:

adding 50 parts by weight to 75 parts by weight of a conjugated diene-based monomer, 1 part by weight to 4 parts by weight of an emulsifier and 0.1 parts by weight to 0.5 parts by weight of a molecular weight control agent into a reactor, and then subjecting thereof to the first polymerization (Step 1); continuously adding 25 parts by weight to 50 parts by weight of a conjugated diene-based monomer for 0.5 hour to 10 hours at the time point of polymerization conversion rate of 10% to 40% in the (Step 1), and then subjecting thereof to the second polymerization (Step 2); and terminating the polymerization at the time point of polymerization conversion rate of 92% or higher in the (Step 2) (Step 3).

Further, the present invention provides a diene-based rubber polymer prepared from the method.

Moreover, the present invention provides an acrylonitrile-butadiene-styrene graft copolymer with a core-shell structure, wherein the core comprises the diene-based rubber polymer of the present invention, the shell comprises an aromatic vinyl compound and a vinyl cyanide compound, and weight ratio of the aromatic vinyl compound and a vinyl cyanide compound constituting the shell (aromatic vinyl compound:vinyl cyanide compound) is from 5:1 to 1:5.

Advantageous Effects

The method for preparing the diene-based rubber polymer according to the present invention can have high polymerization conversion rate by further adding a molecular weight control agent at the time point of the polymerization conversion rate of 40% to 85%, and then conducting polymerization reaction at the first and the second temperature ranges, not conducting the reaction at a single temperature, to control cross-linking reaction.

Further, the diene-based rubber polymer prepared according to the present invention may have improved a swelling index while having low gel content, and the acrylonitrile-butadiene-styrene graft copolymer with the core-shell structure comprising the same may have further improved impact strength characteristic.

Thus, the method for preparing the diene-based rubber polymer of the present invention and the acrylonitrile-butadiene-styrene graft copolymer with the core-shell structure comprising the diene-based rubber polymer prepared by the method can be easily applied to the industries requiring them, in particular, an impact reinforcing agent industry.

BEST MODE FOR CARRYING OUT THE INVENTION

Hereinafter, the present invention will be described in more detail in order to help the understanding of the present invention.

In this case, it should be understood that the terms or words used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The present invention provides a method for preparing a diene-based rubber polymer, which can have low gel content and high swelling index while having high conversion rate, so that the polymer can be easily applied as a rubber ingredient of an acrylonitrile-butadiene-styrene graft copolymer of core-shell structure.

The method for preparing the diene-based rubber polymer according to one embodiment of the present invention is characterized by comprising:

adding 50 parts by weight to 75 parts by weight of a conjugated diene-based monomer, 1 part by weight to 4 parts by weight of an emulsifier and 0.1 parts by weight to 0.5 parts by weight of a molecular weight control agent into a reactor, and then subjecting thereof to the first polymerization (Step 1);

continuously adding 25 parts by weight to 50 parts by weight of a conjugated diene-based monomer for 0.5 hour to 10 hours at the time point of polymerization conversion rate of 10% to 40% in the (Step 1), and then subjecting thereof to the second polymerization (Step 2); and terminating the polymerization at the time point of polymerization conversion rate of 92% or higher in the (Step 2) (Step 3).

The step 1 is mixing the conjugated diene-based monomer, the emulsifier and the molecular weight control agent and initiating polymerization by adding 50 parts by weight to 75 parts by weight of the conjugated diene-based monomer, 1 part by weight to 4 parts by weight of the emulsifier and 0.1 parts by weight to 0.5 parts by weight of the molecular weight control agent into the reactor, and then subjecting thereof to the first polymerization.

In the present invention, the conjugated diene-based monomer may be a single material of a conjugated diene-based monomer, or a monomer mixture comprising a majority of the conjugated diene-based monomer, an aromatic vinyl-based monomer, a vinyl cyanide-based monomer and the like.

The monomer mixture may comprise 55 wt % to 99.7 wt % of the conjugated diene-based monomer; 0.1 wt % to 40 wt % of the aromatic vinyl-based monomer; and 0.1 wt % to 40 wt % of the vinyl cyanide-based monomer.

The conjugated diene-based monomer is not particularly limited, and for example, it may be at least one selected from the group consisting of 1,3-butadiene, isoprene, chloroprene and piperylene. Specifically, it may be 1,3-butadiene.

Further, the aromatic vinyl-based monomer is not particularly limited, and for example, it may be at least one selected from the group consisting of styrene, α-methyl styrene, α-ethyl styrene and p-methyl styrene. Specifically, it may be styrene.

Further, the vinyl cyanide-based monomer is not particularly limited, and for example, it may be at least one selected from the group consisting of acrylonitrile, methacrylonitrile and ethacrylonitrile. Specifically, it may be acrylonitrile.

The emulsifier is not particularly limited, and for example, an anionic adsorption-type emulsifier such as potassium rosinate, potassium fatty acid salt, sodium lauryl sulfonate, sodium alkylbenzene sulfonate and the like, a non-ionic emulsifier such as polyoxyethylene alkylphenyl ether and the like, a reactive emulsifier such as sodium dodecyl allyl sulfosuccinate, alkenyl dipotassium succinate, sodium acrylamido stearate and the like, and a polymeric reactive emulsifier such as polyoxyethylene alkyl phenyl ether ammonium sulfate, polyoxyethylene alkyl ether sulfate ester ammonium salt and the like may be used alone or in combination.

The molecular weight control agent is not particularly limited, and for example, it may be mercaptans such as a-methyl styrene dimer, t-dodecyl mercaptan, n-dodecyl mercaptan and octyl mercaptan, halogenated hydrocarbon such as carbon tetrachoride, methylene chloride and methylene bromide, and sulfur-containing compounds such as tetraethyl thiuram disulfide, dipentamethylene thiuram disulfide and diisopropylxanthogen disulfide. Preferably, it may be t-dodecyl mercaptan.

The first polymerization may be conducted in the presence of at least one additive of ion exchanged water, a polymerization initiator and an electrolyte as occasion demands. In this case, the use amounts of the ion exchanged water, the polymerization initiator and the electrolyte are not particularly limited, and for example, the ion exchanged water may be used at 65 parts by weight to 100 parts by weight, the polymerization initiator may be used at 0.2 parts by weight to 0.4 parts by weight, and the electrolyte may be used at 0.2 parts by weight to 3 parts by weight.

The polymerization initiator may be a common polymerization initiator known in the art without particular limitation, and for example, it may be a water-soluble polymerization initiator such as persulfate, a lipid-soluble polymerization initiator such as a peroxide compound, an oxidation-reduction catalyst and the like.

The persulfate may be potassium persulfate, sodium persulfate, ammonium persulfate and the like, and the lipid-soluble polymerization initiator may be cumene hydroperoxide, diisopropyl benzene hydroperoxide, azobis isobutylnitrile, tertiary butyl hydroperoxide, paramethane hydroperoxide, benzoylperoxide and the like. Further, the oxidation-reduction catalyst may be sodium formaldehyde, sulfoxylate, sodium ethylenediamine tetraacetate, ferrous sulfate, dextrose, sodium pyrophosphate, sodium sulfite and the like.

The electrolyte may be KCl, NaCl, $KHCO_3$, $NaHCO_3$, $K_2CO_3$, $Na_2CO_3$, $K_2SO_4$, $Na_2SO_4$, $KHSO_3$, $NaHSO_3$, $K_4P_2O_7$, $Na_4P_2O_7$, $K_3PO_4$, $Na_3PO_4$, $K_2HPO_4$, $Na_2HPO_4$ and the like.

The second polymerization is continuously adding 25 parts by weight to 50 parts by weight of the conjugated diene-based monomer for 0.5 hour to 10 hours when the first polymerization reaches a polymerization conversion rate of 10% to 40%.

As mentioned above, the preparation method according to the present invention can easily form the diene-based rubber polymer having proper particle diameter by adding the conjugated diene-based monomer in two steps (simultaneous addition and continuous addition) according to the time point of the polymerization conversion rate.

Further, the preparation method of the present invention may further comprise further adding 0.01 parts by weight to 0.3 parts by weight of the molecular weight control agent at the time point that the polymerization conversion rate of the second polymerization step is 40% to 85% in the (Step 2), and more specifically, the molecular weight control agent may be further added at the time point of the polymerization conversion rate of 55% to 70%. The preparation method according to the present invention can inhibit cross-linking reaction by further adding the molecular weight control agent at the time point of the polymerization conversion rate of 40% to 85%, thereby inhibiting a gel content increase and a swelling index decrease while increasing the polymerization conversion rate. Accordingly, as a result, a diene-based rubber polymer having low gel content and relatively high swelling index while having a high polymerization conversion rate can be obtained. Further, the molecular weight control agent may be the same or different with the molecular weight control agent as described above.

On the other hand, according to the present invention, the first polymerization and the second polymerization may be conducted under different temperature conditions, respectively.

Specifically, the first polymerization may be conducted at a temperature from 60° C. to 72° C., and the second polymerization may be conducted at a temperature condition from 72° C. to 85° C. Namely, in the present invention, the polymerization may be conducted by gradually increasing the temperature as the polymerization progresses.

The (Step 3) is terminating polymerization at the time point that the polymerization conversion rate of the second polymerization is 92% or higher in order to obtain the diene-based rubber polymer.

The step of terminating the polymerization may be conducted by using a polymerization inhibitor, and the polymerization inhibitor may be a common polymerization inhibitor known in the art.

Further, the present invention provides a diene-based rubber polymer prepared by the preparation method as described above.

The diene-based rubber polymer according to one embodiment of the present invention may have an average particle diameter (D50) of 2,600 Å to 5,000 Å, a gel content of 70% to 84%, and a swelling index of 11 to 25.

Herein, the Å is a unit of length used to represent wavelength of an electromagnetic radiation, and 1 Å is equal to 0.1 nm.

The gel content represents degree of cross-link in a polymer, i.e., degree of cross-linking of a polymer, and as the gel content value is larger, the degree of cross-linking of a polymer may be higher.

The swelling index represents degree of swelling of a polymer by a solvent, and as the degree of cross-linking of a polymer is higher, the swelling index may be lower.

Moreover, the present invention provides an acrylonitrile-butadiene-styrene copolymer comprising the diene-based rubber polymer.

The present invention provides the acrylonitrile-butadiene-styrene graft copolymer with the core-shell structure characterized that the core comprises the diene-based rubber polymer of claim 15, the shell comprises an aromatic vinyl compound and a vinyl cyanide compound, and weight ratio of the aromatic vinyl compound and the vinyl cyanide compound constituting the shell (aromatic vinyl compound:vinyl cyanide compound) is from 5:1 to 1:5.

In this case, the weight ratio of the core to the shell may be from 30 parts by weight:70 parts by weight to 70 parts by weight:30 parts by weight.

If the core is contained in the copolymer in an amount of less than 30 parts by weight, characteristics of the finally formed acrylonitrile-butadiene-styrene copolymer may be decreased, for example, it may harden. And if it is contained in an amount of greater than 70 parts by weight, because the shell content is relatively reduced, there may be problems that oil resistance of the finally formed acrylonitrile-butadiene-styrene copolymer may be decreased and its tensile strength may be reduced.

Further, if the shell is contained in the copolymer in an amount of less than 30 parts by weight, oil resistance of the finally formed acrylonitrile-butadiene-styrene copolymer may be decreased and its tensile strength may be reduced. And if the shell is contained in an amount of greater than 70 parts by weight, because the core part is relatively decreased, the finally formed acrylonitrile-butadiene-styrene copolymer may harden.

Further, the copolymer of the present invention may be the one having a graft rate of 15% to 40%, and a weight average molecular weight of free rubber extracted from the dried copolymer powder may be 25,000 to 65,000.

On the other hand, according to the present invention, the acrylonitrile-butadiene-styrene copolymer can be prepared by a common method known in the art without particular limitation, and for example, it may be prepared by adding additives such as the aromatic vinyl compound, the vinyl cyanide compound and the emulsifier to the diene-based rubber polymer, subjecting thereof to emulsion polymerization, and then coagulating and washing thereof. In this case, each of components can be involved in the reaction by a method of adding the components to the reactor simultaneously, a method of continuously adding thereof or a method of firstly adding a part of the components and then adding the rest of them after initiating polymerization.

Further, in order to easily achieving the emulsion polymerization, as occasion demands, an additive such as a chelating agent, a dispersing agent, a pH adjusting agent, an oxygen absorber, a particle diameter control agent, an antioxidant and an oxygen scavenger can be further used, and the emulsion polymerization may be commonly conducted at a temperature range from 10° C. to 90° C., and preferably at a temperature range from 25° C. to 75° C.

Further, the coagulation is to form acrylonitrile-butadiene-styrene copolymer latex coagulates by coagulating the acrylonitrile-butadiene-styrene copolymer latex composition formed after the emulsion polymerization, and it can be conducted by a common method known in the art, for example by treating aqueous base solution or aqueous acid solution to the composition and then subjecting thereof to base coagulation or acid coagulation.

The washing is to obtain the acrylonitrile-butadiene-styrene copolymer by removing impurities (residual emulsifier, coagulating agent and the like) from the acrylonitrile-butadiene-styrene copolymer latex coagulates formed by the base coagulation or the acid coagulation, and it may be conducted by adding the coagulates to aqueous inorganic salt solution and then washing and drying thereof.

In this case, the washing and the drying may be conducted by a common method known in the art without particular limitation.

MODE FOR CARRYING OUT THE INVENTION

Hereinafter, the present invention will be described in more detail, according to the following Examples and Test Examples. However, the following Examples and Test Examples are merely presented to exemplify the present invention, and the scope of the present invention is not limited thereto.

EXAMPLE

Example 1

1) Preparation of Diene-Based Rubber Polymer 65 parts by weight of ion exchanged water, 70 parts by weight of 1,3-butadiene, 1.5 parts by weight of potassium rosinate, 0.8 parts by weight of potassium oleate, 0.8 parts by weight of potassium carbonate ($K_2CO_3$), 0.3 parts by weight of tertiary dodecyl mercaptan (TDDM) and 0.3 part by weight of potassium persulfate ($K_2S_2O_8$) were simultaneously added into a nitrogen-substituted polymerization reactor (Autoclave), and then reacted at 70° C. until polymerization conversion rate reached 30% (first polymerization). Then, 30 parts by weight of 1,3-butadiene was continuously added for 6 hours, and then reaction temperature was slowly raised for 10 hours from the time point of continuous addition until the temperature reached 80° C. (second polymerization). In this case, when the polymerization conversion rate reached 55%, 0.05 parts by weight of the tertiary dodecyl mercaptan was further added thereto and reacted. Then, when the polymerization conversion rate reached 93%, the reaction was terminated by adding a polymerization inhibitor, N,N-diethyl hydroxyl amine, so as to obtain a diene-based rubber polymer.

2) Preparation of Acrylonitrile-Butadiene-Styrene Copolymer 60 parts by weight the diene-based rubber polymer prepared in the above 1) and 100 parts by weight of ion exchanged were added to a nitrogen-substituted polymerization reactor, a mixed solution consisting of 10 parts by weight of acrylonitrile, 30 parts by weight of styrene, 25 parts by weight of ion exchanged water, 0.12 parts by weight of t-butyl hydroperoxide, 1.0 part by weight of potassium rosinate and 0.3 parts by weight of tertiary dodecyl mercaptan, which was mixed in a separate blending apparatus, was continuously added into the polymerization reactor at 70° C. for 3 hours with 0.054 parts by weight of dextrose, 0.004 parts by weight of sodium pyrophosphate and 0.002 parts by weight of ferrous sulfate. After terminating the continuous addition, 0.05 parts by weight of dextrose, 0.03 parts by weight of sodium pyrophosphate, 0.001 parts by weight of ferrous sulfate and 0.05 parts by weight of t-butyl hydroperoxide were simultaneously added into the polymerization reactor, the temperature was raised for 1 hour up to 80° C., and then the reaction was terminated. The formed acrylonitrile-butadiene-styrene copolymer latex was coagulated with aqueous sulfuric acid, washed and then dried to obtain an acrylonitrile-butadiene-styrene copolymer powder.

Comparative Example 1

The procedure of Example 1 was repeated except for not further adding the tertiary dodecyl mercaptan when the polymerization conversion rate reached 55% during preparation of the diene-based rubber polymer to obtain acrylonitrile-butadiene-styrene copolymer powder.

Comparative Example 2

The procedure of Example 1 was repeated except for further adding 0.05 parts by weight of the tertiary dodecyl mercaptan when the polymerization conversion rate reached 30% instead of 55% during preparation of the diene-based rubber polymer to obtain acrylonitrile-butadiene-styrene copolymer powder.

Comparative Example 3

The procedure of Example 1 was repeated except for adjusting the reaction temperature of the first polymerization to 85° C., and adjusting the reaction temperature of the second polymerization to 70° C. by slowly lowering the temperature during preparation of the diene-based rubber polymer to obtain acrylonitrile-butadiene-styrene copolymer powder.

Comparative Example 4

The procedure of Example 1 was repeated except for adjusting the reaction temperature of the first polymerization to 75° C., and adjusting the reaction temperature of the second polymerization to 75° C., the same temperature with the first polymerization, during preparation of the diene-based rubber polymer to obtain acrylonitrile-butadiene-styrene copolymer powder.

Test Example 1

Properties of each of the diene-based rubber polymers and the acrylonitrile-butadiene-styrene copolymers prepared in Example and Comparative Examples 1 to 4 were comparatively analyzed. The results were shown in the following Table 1.

1) Conversion Rate (%)

A conversion rate of each of the diene-based rubber polymers prepared in Example 1 and Comparative Examples 1 to 4 was measured, and comparatively analyzed.

2) Gel Content (%) and Swelling Index

A gel content of each of the diene-based rubber polymers prepared in Example 1 and Comparative Examples 1 to 4 was measured, and comparatively analyzed.

To measure the gel content, 100 g of toluene was added to 1 g of each diene-based rubber polymer and stored in a darkroom of room temperature for 48 hours, and then the part not dissolved in the toluene was collected. The gel content was calculated by the following formula.

$$\text{Gel Content}(\%) = \frac{\text{Weight of insoluble gel}}{\text{Weight of sample}} \times 100$$

-continued $$\text{Swelling Index} = \frac{\text{Weight of swollen gel}}{\text{Wegiht of gel}}$$

3) Weight Average Molecular Weight of Free Rubber

A weight average molecular weight and a molecular weight distribution of free rubber (the part not cross-linked thereby extracted out), which was extracted from each acrylonitrile-butadiene-styrene copolymer powder prepared in Example 1 and Comparative Examples 1 to 4.

Each extracted free rubber was dissolved in THF (tetrahydrofuran), and then the weight average molecular weight and the molecular weight distribution were measured using a gel permeation chromatography (GPC) analyzer.

4) Impact Strength

In order to analyze the effect of each of the acrylonitrile-butadiene-styrene copolymers prepared in Example 1 and Comparative Examples 1 to 4 on improving impact strength, the impact strength of each copolymer was measured.

To measure the impact strength, each 27.5 parts by weight of acrylonitrile-butadiene-styrene copolymer and 72.5 parts by weight of styrene-acrylate copolymer (SAN, 92HR, LG Chem, Ltd.) were mixed in a blender and then pelleted using an extruder.

Each pellet was prepared as a test specimen with thickness of ¼ inch, and then the impact strength (kgfcm/cm) was measured according to ASTM D256.

TABLE 1

| | Diene-based rubber polymer | | | | Acrylonitrile-butadiene-styrene copolymer | | |
|---|---|---|---|---|---|---|---|
| Section | Conversion rate (%) | Reaction time (hr) | Gel content (%) | Swelling index | Free rubber weight average molecular weight | Free rubber molecular weight distribution | Impact strength (kgfcm/cm) |
| Example 1 | 93 | 21.5 | 79 | 17 | 31242 | 2.47 | 36 |
| Comp. Example 1 | 93 | 21 | 85 | 14 | 18590 | 1.81 | 32 |
| Comp. Example 2 | 93 | 22 | 81 | 16 | 28313 | 2.15 | 34 |
| Comp. Example 3 | 93 | 20 | 85 | 13 | 22307 | 2.09 | 31 |
| Comp. Example 4 | 86 | 28 | 74 | 18 | 33460 | 2.68 | 36 |

As shown in the Table 1, according to the present invention, under the polymerization reaction temperature condition divided into two steps, the case of Example 1, adding 0.05 parts by weight of the tertiary dodecyl mercaptan when the polymerization conversion rate reached 55% while raising the second polymerization reaction temperature from the first polymerization reaction temperature of 70° C. to 80° C., showed lower gel content, higher swelling index and higher impact strength even at high conversion rate of 93%, compared to Comparative Example 1 not adding the tertiary dodecyl mercaptan.

On the other hand, the case of Comparative Example 2, adding the tertiary dodecyl mercaptan when the polymerization conversion rate reached 30%, less affected to the gel content and the swelling index, and less improved the impact strength, compared to Example 1. On the other hand, in the case of Comparative Example 3 lowering the reaction temperature from 85° C. to 70° C., the gel content was not reduced, the swelling index was not increased, and the impact strength was decreased. The case of Comparative Example 4, constantly maintaining the reaction temperature to 75° C., showed low gel content, high swelling index and high impact strength. But Comparative Example 4 showed delayed reaction time and low polymerization conversion rate.

The invention claimed is:

1. A method for preparing a diene-based rubber polymer comprising:

preparing a first solution by adding 50 parts by weight to 75 parts by weight of one or more monomers that include a conjugated diene-based monomer, 1 part by weight to 4 parts by weight of an emulsifier and 0.1 parts by weight to 0.5 parts by weight of a molecular weight control agent into a reactor, and then subjecting the first solution to a first polymerization at a temperature from 60° C. to 72° C. (Step 1);

preforming a second polymerization by continuously adding 25 parts by weight to 50 parts by weight of the one or more monomers that include a conjugated diene-based monomer for 0.5 hour to 10 hours when the first polymerization reaches a polymer conversion rate of 10% to 40% (Step 2); and terminating the second polymerization when the polymer conversion rate of the second polymerization reaches 92% or higher (Step 3), wherein 0.01 parts by weight to 0.3 parts by weight of a molecular weight control 85%.

2. The method for preparing the diene-based rubber polymer of claim 1, wherein 0.01 parts by weight to 0.3 parts by weight of a molecular weight control agent is further added when the polymer conversion rate of the second polymerization step is 55% to 70%.

3. The method for preparing the diene-based rubber polymer of claim 1, wherein the second polymerization is conducted at a temperature from 72° C. to 85° C.

4. The method for preparing the diene-based rubber polymer of claim 1, wherein the first polymerization is conducted in the presence of at least one additive selected from ion exchanged water, a polymerization initiator and an electrolyte.

5. The method for preparing the diene-based rubber polymer of claim 1, wherein the one or more monomers that include a conjugated diene-based monomer is a single material or a mixture comprising a majority of the conjugated diene-based monomer.

6. The method for preparing the diene-based rubber polymer of claim 5, wherein the one or more monomers that include a conjugated diene-based monomer is the mixture, and the mixture comprises 55 wt % to 99.7 wt % of the conjugated diene-based monomer; 0.1 wt % to 40 wt % of an aromatic vinyl-based monomer; and 0.1 wt % to 40 wt % of a vinyl cyanide-based monomer.

7. The method for preparing the diene-based rubber polymer of claim 5, wherein the conjugated diene-based monomer is at least one selected from the group consisting of 1,3-butadiene, isoprene, chloroprene and piperylene.

8. The method for preparing the diene-based rubber polymer of claim 6, wherein the aromatic vinyl-based monomer is at least one selected from the group consisting of styrene, α-methyl styrene, α-ethyl styrene and p-methyl styrene.

9. The method for preparing the diene-based rubber polymer of claim 6, wherein the vinyl cyanide-based monomer is at least one selected from the group consisting of acrylonitrile, methacrylonitrile and ethacrylonitrile.

10. The method for preparing the diene-based rubber polymer of claim 1, wherein the polymerization is terminated by using a polymerization inhibitor.

* * * * *